(12) United States Patent
Zhao et al.

(10) Patent No.: US 6,602,956 B2
(45) Date of Patent: Aug. 5, 2003

(54) MELT STRENGTH THERMOPLASTIC ELASTOMERS AND METHODS FOR MAKING SAME

(75) Inventors: Xia Zhao, Coppell, TX (US); Hoan Tran, Arlington, TX (US); Charles G. Reid, Southlake, TX (US); Ruidong Ding, Arlington, TX (US)

(73) Assignee: Solvay Engineered Polymers, Grand Prairie, TX (US)

( * ) Notice: Subject to any disclaimer, the term of this patent is extended or adjusted under 35 U.S.C. 154(b) by 0 days.

(21) Appl. No.: 10/008,866

(22) Filed: Nov. 13, 2001

(65) Prior Publication Data

US 2003/0105232 A1 Jun. 5, 2003

(51) Int. Cl.$^7$ .............................................. C08F 299/00
(52) U.S. Cl. ........................ 525/191; 525/192; 525/194; 525/195; 525/196; 525/301
(58) Field of Search ................................ 525/191, 192, 525/194, 195, 196, 301

(56) References Cited

U.S. PATENT DOCUMENTS

| | | |
|---|---|---|
| 3,758,643 A | 9/1973 | Fischer |
| 3,806,558 A | 4/1974 | Fischer |
| 4,130,535 A | 12/1978 | Coran et al. |
| 4,311,628 A | 1/1982 | Abdou-Sabet et al. |
| 4,323,528 A | 4/1982 | Collins .................... 264/53 |
| 4,365,044 A | 12/1982 | Liu ........................ 525/240 |
| 4,770,422 A | 9/1988 | Isaac ...................... 273/218 |
| 5,508,318 A | 4/1996 | Comer ..................... 522/112 |
| 6,207,746 B1 | 3/2001 | Uchida et al. ............. 524/528 |

FOREIGN PATENT DOCUMENTS

| | | |
|---|---|---|
| GB | 1091818 | 11/1967 |
| JP | 4-261448 | 9/1992 |
| JP | 7-033917 | 2/1995 |
| WO | 98/12251 | 3/1998 |

OTHER PUBLICATIONS

Lau et al., "Melt Strength of Polypropylene: Its Relevance to Thermoforming," Polymer Engineering and Science 38 (1988): 1915–1923.

*Primary Examiner*—Jeffrey Mullis
(74) *Attorney, Agent, or Firm*—Winston & Strawn

(57) ABSTRACT

The melt strength is increased and the gloss level is reduced in olefinic TPE compositions through the addition of sufficient amounts of free radical generators (A) and co-curative agents (B). The free radical generators (A) include peroxides, organic peroxides, the persulfates, and the diazo compounds, and mixtures thereof. The co-curative agents (B) includes metal salts of alpha, beta-unsaturated carboxylic acids and alpha, beta-unsaturated carboxylic acids where the pending acid group has been neutralized, or mixtures thereof, and the metals for forming the metal salts of co-curative agent (B) include zinc, lithium, calcium, magnesium, sodium or aluminum, or mixtures thereof.

20 Claims, 4 Drawing Sheets

MELT STRENGTH THERMOPLASTIC ELASTOMERS AND METHODS FOR MAKING SAME

FIELD OF INVENTION

This invention relates to thermoplastic elastomer compositions with enhanced melt strength and reduced surface gloss for extrusion, injection molding, compression molding, calendering, thermoforming, blow molding, and foam processing, and articles made therefrom.

BACKGROUND OF THE INVENTION

There is a need for recyclable materials that can be used as alternatives to polyvinyl chloride for the fabrication of articles. Polyvinyl chloride, often used with a plasticizer, can be formed into a rubbery, thin sheet for use as a skin layer over a rigid or soft substrate. Due to the combination of the tactile feel (softness) and the melt strength during processing, plasticized polyvinyl chloride can be a very desirable material. Polyvinyl chloride, however, is not easily recyclable or melt blendable with non-polar polymers, which has limited the utility of polyvinyl chloride to applications where recyclability is not desired. Materials with processing characteristics similar to polyvinyl chloride, such as high melt strength, are being actively sought.

A thermoplastic elastomer (TPE) is a material that exhibits rubber-like characteristics, yet may be melt processed with most thermoplastic processing equipment, such as by extrusion. The rubber-like characteristics typically desired are high extensibility, mechanical recovery, resiliency, and low temperature ductility. An olefinic thermoplastic elastomer includes primarily polymers manufactured by the polymerization of at least 50 mole percent olefinic monomers such as ethylene, propylene, butylene, iso-butylene, alpha-olefins, olefinic dienes, and the like. Olefinic thermoplastic elastomers including thermoplastic olefin blends, thermoplastic polymer alloy compositions, and dynamically vulcanized thermoplastic elastomers have been explored for such applications. Most olefinic TPE compositions, however, suffer from low melt strength, making such compositions undesirable for industrial processes where stretching and/or drawing of the material is required.

Some effort has been made in the art to overcome the melt strength deficiency of olefinic thermoplastic elastomers. One approach, as reflected in U.S. Pat. No. 4,365,044, is to blend polypropylene with a low density polyethylene, which has the desirable melt strength properties alone or together with other polymeric substances. Although the blend approach has met with some success, it is not preferred.

Another approach is to blend an irradiated partially crystalline polyolefin with high melt strength and a non-irradiated polyolefin, as disclosed in U.S. Pat. No. 5,508,318. This composition exhibits many desirable characteristics for extruded thin sheets, but suffers from a low melt strength at higher temperatures. The composition also has the disadvantage of higher cost due to the electron beam irradiation process and the subsequent number of melt blending steps required to achieve the desired material by incorporation of other raw materials and ingredients.

Likewise, there are a number of references that disclose the treatment of olefinic thermoplastic elastomers via a free radical generator. So-called dynamically vulcanized alloys (DVAs) can be prepared through the process of dynamic vulcanization such as that described in U.S. Pat. No. 3,806,558. Using this process, an elastomer can be crosslinked during melt mixing with a rigid thermoplastic polyolefin to yield a material that is melt processable, yet exhibit characteristics similar to thermoset elastomers. Compositions obtained with this process are micro-gel dispersions of cured elastomer is an uncured matrix of thermoplastic polymer. Commercial olefinic thermoplastic elastomer materials that use this technology of dynamic vulcanization are well known and are disclosed in U.S. Pat. Nos. 4,130,535 and 4,311,628. The materials disclosed in these patents are known as Santoprene® and utilize a phenolic resin to crosslink the olefin elastomer phase. The Santoprene® materials are melt processable and can be extruded into profiles such as sheets. They also tend to exhibit high melt strength, but have very little ductility and draw, which reduces the utility of the material technology for processing applications such as thermoforming, blow molding and forming.

The use of organic peroxide to crosslink the elastomer phase in an olefinic-based DVA is well known to those of ordinary skill in the art. For example, U.S. Pat. No. 3,758,643 discloses that peroxide 2,6-bis(t-butylperoxy)-2,5-dimethylhexane at a concentration of 0.05 to 0.4 weight percent is useful for crosslinking the elastomer phase in the olefinic DVA. The use of peroxide alone, however, can be detrimental to the high molecular weight polypropylene due to the beta-scission that occurs and results in a very low molecular weight for the thermoplastic phase. The consequences of this degradation include lower melt strength and poor solid-state mechanical properties.

U.S. Pat. No. 6,207,746 discloses a process for producing thermoplastic elastomers with olefin-elastomer and polypropylene via a radical-initiated mechanism. The patent further teaches that radical initiators above a concentration of 0.02 parts by weight of weight of the elastomer are required to accomplish a sufficient degree of crosslinking. It is known in the prior art that a combination of a free radical generators such as peroxide and the metal salt of an alpha, beta-unsaturated carboxylic acid may be used as a curing system for various polymers. U.S. Pat. No. 4,770,422 discloses a method for crosslinking polybutadiene by utilizing curative agents of about 25 to 40 parts by weight zinc (di)acrylate per 100 parts by weight polybutadiene and about 0.2 to 0.8 parts by weight per 100 parts of weight polybutadiene of peroxide. In addition, a method for curing compositions containing halogenated isomonoolefin/para-alkylstyrene random copolymers is disclosed in WO 98/12251. A polyvalent metal salt is present at a level of about 0.5 to 10 weight percent while the organic peroxide is present in a level of about 0.2 to 5 weight percent.

British Patent No. 1,091,818 discloses a method of curing a vulcanization mixture by adding an organic peroxide at a concentration of 0.1 to 10 parts by weight per 100 parts by polymer and a metal salt of methacrylic acid at a concentration of 1 to 10 parts by weight per 100 parts of polymer. The relatively high organic peroxide content disclosed therein would tend to cause significant chain scission of polypropylene, thereby leading to lower viscosity (or higher melt flow rate) and a resulting loss in melt strength properties.

Japanese Kokai Publication No. 7-33917 discloses a method for decreasing flow marks by breaking the propylene-containing component through heat degradation and then crosslinking the ethylene-containing components through the addition of an organic peroxide and an alpha, beta-unsaturated carboxylic acid metal salt. The ethylene content of the final blend is kept to 90–99.5 mole percent.

There remains a need for olefinic thermoplastic elastomers with improved melt strength and reduced gloss level, while still retaining other suitable characteristics such as ductility, for use in such industrial processes as extrusion, injection molding, compression molding, calendering, thermoforming, blow molding, and foam processing.

SUMMARY OF THE INVENTION

The invention relates to a modified olefinic thermoplastic elastomer composition formed by melt blending a thermoplastic olefinic elastomer with sufficient amounts of a free radical generator (A) and a co-curative agent (B) to promote crosslinking to a gel content of about 10 to 80%, wherein the olefinic thermoplastic elastomer and the modified olefinic thermoplastic elastomer composition each have a melt strength measured at a temperature of 220° C. and a surface gloss level, with the melt strength of the modified olefinic thermoplastic elastomer composition divided by the melt strength of olefinic thermoplastic elastomer before addition of the curative agents provided a ratio of about 1.5/1 to 20/1, and with the surface gloss level of the olefinic thermoplastic elastomer composition after addition of the curative agents (GL2) divided by the surface gloss level of the olefinic thermoplastic elastomer composition before addition of the curative agents (GL1) providing a ratio which is equal to or greater than 0.01 but equal to or less than 0.5.

In a preferred embodiment, the ratio of the melt strength of the modified olefinic thermoplastic elastomer composition to the melt strength of the olefinic thermoplastic elastomer composition before addition of the curative agents is about 1.6 to 15. The sufficient amounts of components are typically about 0.001 to 0.05 pph of free radical generator (A) and about 0.001 to 7.5 pph of co-curative agent (B). Preferably, the free radical generator (A) is present in an amount of about 0.001 to 0.04 pph and the co-curative agent (B) is present in an amount of about 0.001 to 7 pph.

Typically, the free radical generator (A) includes one or more peroxides, persulfates, or diazo compounds, or mixtures thereof. Preferably, at least one organic peroxide is included. More preferably, the free radical generator (A) has a decomposition half-life of greater than about one hour at 120° C.

The co-curative agent (B) typically includes metal salts of alpha, beta-unsaturated carboxylic acids, or alpha, beta-unsaturated carboxylic acids where the pending acid group has been neutralized, or mixtures thereof. In a preferred embodiment, the alpha, beta-unsaturated carboxylic acids or co-curative agent (B) includes acrylic, methacrylic maleic, fumaric, ethacrylic, vinyl-acrylic, itaconic, methyl itaconic, aconitic, methyl aconitic, crotonic, alpha-methylcrotonic, cinnamic, or 2,4-dihydroxy cinnamic acids, or mixtures thereof. In a more preferred embodiment, the alpha, beta-unsaturated carboxylic acids of co-curative agent (B) comprise acrylic, methacrylic, or maleic acids, or mixtures thereof. In yet another embodiment, the metals for forming the metal salts of co-curative agent (B) include zinc, lithium, calcium, magnesium, sodium, or aluminum, or mixtures thereof.

The blends of the invention can also include one or more thermal stabilizers, ultraviolet stabilizers, flame retardants, mineral fillers, extender or process oils, conductive fillers, nucleating agents, plasticizers, impact modifiers, colorants, mold release agents, lubricants, antistatic agents, and pigments.

The invention also relates to articles prepared by the method specified above, which are formed by thermoforming, blow molding, extrusion, injection molding, compression molding, calendering or foam processing.

The invention also encompasses each of these above-named embodiments with respect to the following two aspect of the invention.

First, the invention also relates to the modified olefinic thermoplastic elastomer compositions above formed by a process that includes melt blending a thermoplastic elastomer composition in the presence of sufficient amounts of a free radical generator (A) and a co-curative agent (B) to generate co-curative radicals to form a modified olefinic thermoplastic elastomer composition, wherein the ratio of the melt strength of the modified olefinic thermoplastic elastomer composition to the melt strength of the olefinic thermoplastic elastomer composition before addition of the curative agents is about 1.5 to 20, measured at a temperature of 220° C., and the surface gloss level of the olefinic thermoplastic elastomer composition before addition of the curative agents (GL1) to the gloss level after addition of the curative agents (GL2) satisfies the formula: $0.01 \leq GL2/GL1 \leq 0.5$.

Second, the invention also includes a method of forming a modified olefinic thermoplastic elastomer composition by melt blending a thermoplastic elastomer composition in the presence of sufficient amounts of a free radical generator (A) and a co-curative agent (B) to generate co-curative radicals to form a modified olefinic thermoplastic elastomer composition, wherein the ratio of the melt strength of the modified olefinic thermoplastic elastomer composition to the melt strength of the olefinic thermoplastic elastomer composition before addition of the curative agents is about 1.5 to 20, measured at a temperature of 220° C., and the surface gloss level of the olefinic thermoplastic elastomer composition before addition of the curative agents (GL1) to the gloss level after addition of the curative agents (GL2) satisfies the formula: $0.01 \leq GL2/GL1 \leq 0.5$.

In one embodiment, the method further includes forming the modified composition into an article. In a preferred embodiment, the forming includes extruding, thermoforming, injection molding, compression molding, blow molding, form processing or calendering the modified composition to form the article.

BRIEF DESCRIPTION OF THE DRAWINGS

Further features and advantages of the present invention can be seen from the following illustrative drawings.

DETAILED DESCRIPTION OF THE INVENTION

Figure 1:
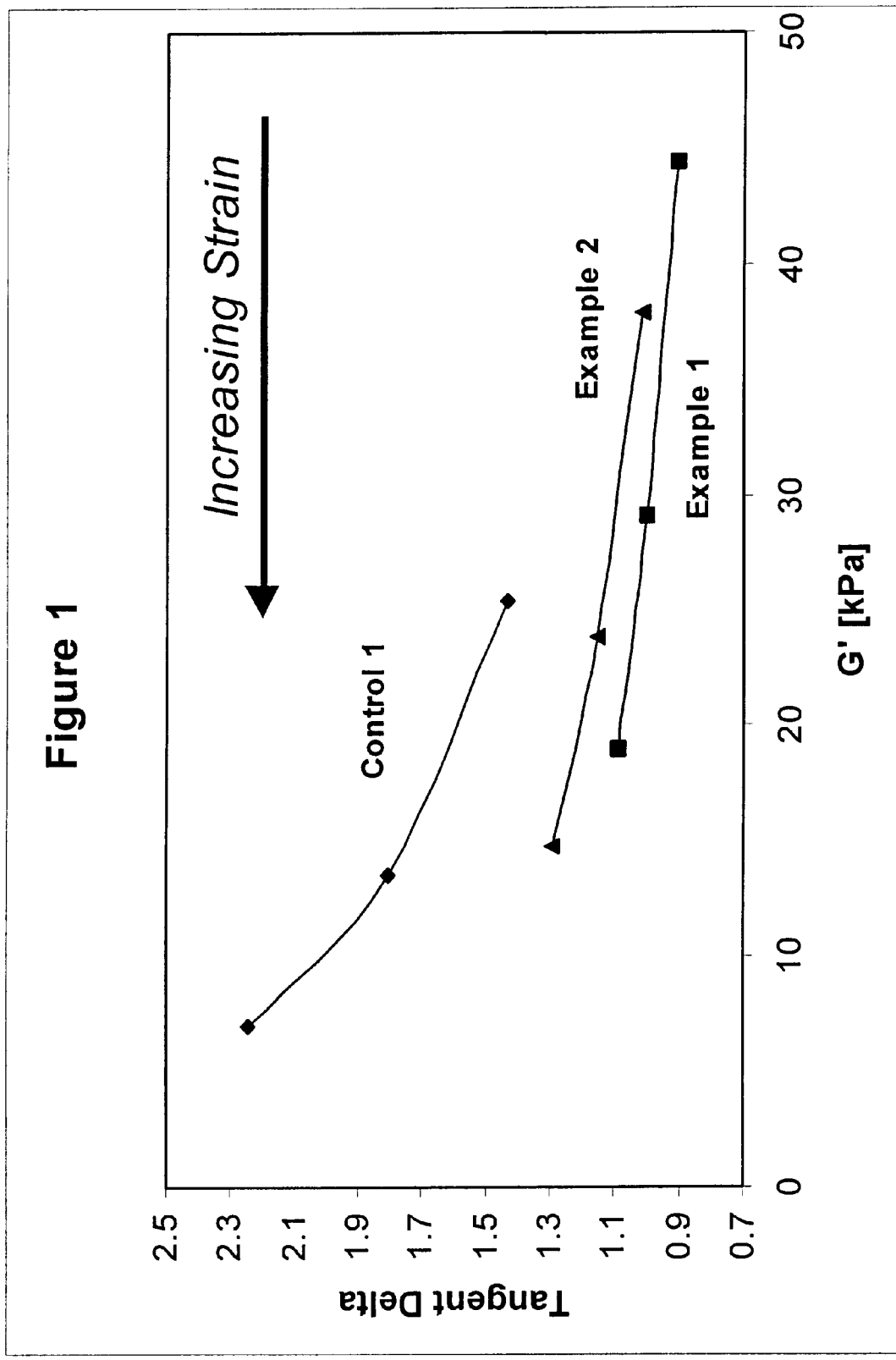
FIG. 1 is a graphical depiction of the mechanical loss factor (tangent-delta) as a function of the in-phase shear modulus (G'), or storage modulus, for Examples 1 and 2 as well as Control 1, measured at constant shear rate (approximately 14 $sec^{-1}$) obtained by variable strain and frequency at a temperature of 160° C. in the melt state.

The present invention successfully improves the rheological properties in the molten state for each component in an olefinic thermoplastic elastomer (TPE) blend. The modified olefinic TPE exhibits an increased resistance to deformation during elongation or extension as well as a reduced level of surface gloss and does not exhibit the disadvantages of the prior art compositions.

It has been found that the melt strength of olefinic thermoplastic elastomer compositions is increased and the gloss level of olefinic TPEs is decreased by melt blending the olefinic TPE in the presence of a combination of sufficient amounts of free radical generators (A) and co-curative agents (B). The melt flow rate of the modified olefinic TPE is also preferably reduced. Moreover, the use of either (A) or (B) alone, rather than in combination, is less preferred as it results in a significant reduction in the melt strength of the modified olefinic TPE blend. Preferably, the modified olefinic TPE blends yield high melt strength when modified according to the invention.

Melt strength helps keep a polymeric material from tearing or excessive deformation when subjected to stress while in the melted state. For example, vacuum thermoforming processes typically require that a material be preheated with controllable sagging under the force of gravity and then be stretched over a thermoforming mold under vacuum without tearing. Melt strength is also desirable for blow molding processes, whereby molten or softened material is deformed from within by air pressure into a constraining mold. Foaming processes also benefit from melt strength, which leads to improved and even controlled bubble growth rate without premature cell collapse. Increasing the molecular weight of any given polymer can also increase the melt strength through increased chain entanglement, with all other factors held equal. High molecular weight amorphous polymers, such as polyvinyl chloride and polystyrene, exhibit high melt strength and drawability during processing via melt extrusion or thermoforming. Unlike thermoplastic elastomers, however, these two polymer classes are generally not easily recycled.

The ratio of the melt strength of the modified blend to the melt strength of the blend before the TPE modification according to the invention, as determined by tests with the Gottfert™ Rheotens Melt Tension instrument Model 71.97 at a temperature of at least 180° C., should be about 1.5 to 20, preferably about 1.6 to 15. The improvement in melt strength is desired across a broad range of temperatures, which translates into an increased processing window. A "processing window" is defined as the ranges of processing conditions, such as melt temperature, melt strength, pressure and shear rate, within which a specific plastic can be fabricated with acceptable or optimum properties by a particular fabrication process.

Additional polymer properties desired for certain applications, such as automotive interior skin layers, are low surface gloss, flexibility, abrasion resistance, and toughness. Low surface gloss, for example, is a characteristic useful in such applications as automotive instrument panel skins where glare or reflectance detracts from the version of the driver. In many instances, a polyvinyl chloride skin is coated to control gloss level, adding additional expense to the manufacturing cost. The surface gloss level of the modified olefinic TPE composition will be reduced via the modification of the current invention. The surface gloss level of the olefinic thermoplastic elastomer composition before addition of the curative agents (GL1) to the gloss level after addition of the curative agents (GL2) should satisfy the formula:

$$0.01 \leq GL2/GL1 \leq 0.5$$

The free radical generators (A) used for the olefinic TPE modification of the invention are most typically chosen from among the peroxides, preferably organic peroxides, persulfates, diazo compounds, and mixtures thereof. Organic peroxides with a decomposition half-life of greater than one hour at 120° C. are preferred. Examples of organic peroxides that are useful include: dicumyl peroxide; bis (alpha-t-butyl peroxyisopropyl)benzene; isopropylcumyl t-butyl peroxide; t-butylcumylperoxide; di-t-butyl peroxide; 2,5-bis(t-butylperoxy)-2,5-dimethylhexane; 2,5-bis(t-butylperoxy)2,5-dimethylhexyne-3; 1,1-bis(t-butylperoxy) 3,3,5-trimethylcyclohexane; isopropylcumyl cumylperoxide; di(isopropylcumyl) peroxide, 3,6,9-triethyl-3,6,9-trimethyl-1,4,7-triperoxonane; or mixtures thereof. The peroxides 2,5-bis(t-butylperoxy)2,5-dimethylhexane, 3,6,9-triethyl-3,6,9-trimethyl-1,4,7-triperoxonane, 2,5-bis(t-butylperoxy)2,5-dimethylhexyne-3, and mixtures thereof, are preferred due to their liquid state, low volatility, higher decomposition temperature, and lower residual odor in the final article compared to other peroxides.

The optimization of the amount of free radical initiator (A) in the melt state is important to achieve the proper modification. The amount of peroxide or other free radical initiators should be sufficient to generate radicals of the co-curative agent without generating significant amounts of polymer radicals, which cause more rapid polymer degradation. Such polymer degradation is undesirable. In a preferred embodiment, the amount of free radical initiator is insufficient to cause significant polymer degradation. The free radical initiator should be present in an amount sufficient to promote crosslinking to a gel content of about 10 to 80%. The proper amount of peroxides or other initiator will vary depending on the selection of initiator and polymers, and will be readily determined by those of ordinary skill in the art with reference to the description herein. In the case of olefinic TPE blends containing polypropylene, the concentration of initiator should be kept to as low an level as possible, particularly when peroxides are used alone or in combination as the initiator. When peroxide levels are too high, the reaction of propylene degradation dominates the more preferred reaction of propylene branching in the presence of free radical initiators. Generally, about 0.001 to 0.05 part per hundred (pph) of peroxides should be used, preferably about 0.001 to 0.04 pph.

The co-curative agents (B) used in the present invention include metal salts of alpha, beta-unsaturated organic acids or alpha, beta-unsaturated organic acids where the pending acid group has been neutralized. The alpha, beta-unsaturated organic acids may be acrylic, methacrylic, maleic, fumaric, ethacrylic, vinyl-acrylic, itaconic, methyl itaconic, aconitic, methyl aconitic, crotonic, alpha-methylcrotonic, cinnamic and 2,4-dihydroxy cinnamic acids, and combinations thereof. Acrylic, methacrylic and maleic acids are preferred, either alone or in combination. The metals used for forming the metal salts are not limited, but generally are divalent metals such as zinc, lithium, calcium, magnesium, sodium or aluminum. Zinc is more preferred. Generally about 0.001 to 7.5 pph of the co-curative agent (B) is used, preferably about 0.001 to 7.0 pph.

The method of the current invention is useful in improving the melt strength and reducing the gloss level of a number of different olefinic TPE compositions. The significance of the invention is particularly important to blends conventionally having poor melt strength, such as those compositions prepared from semi-crystalline elastomer components with narrow molecular weight distributions. The amount of the various polymeric components is not crucial, and modification of a wide variety of olefinic TPE polymers can be accomplished according to the invention. In one preferred embodiment, the polymeric component includes propylene units, ethylene units, or a styrenic elastomer, or a combination thereof.

Suitable polymeric components include homopolymers or propylene and copolymers of propylene with at least one other monomer chosen from $C_2$ to $C_{20}$ alpha-olefins, unsaturated organic acids and their derivatives, vinyl esters, aromatic vinyl compounds, vinylsilanes and unconjugated aliphatic and monocyclic diolefins, alicyclic diolefins which have an endocyclic bridge and conjugated aliphatic diolefins. Ethylene, 1-butene, 1-pentene, 1-hexene, methyl-1-butenes, methyl-1-pentenes, 1-octene and 1-decene are among the many examples of suitable alpha-olefins. Copolymers of propylene with alpha-olefins are particularly preferred and, among these, copolymers of propylene with at least one other monomer chosen from ethylene and 1-butene yield good results. Propylene polymers are commercially available, for example, as Pro-fax® from Basell North America, Inc. of Wilmington, Del., as Fortilene® or HP/P 9000® from Solvay Polymers of Houston, Tex. and as Acctuff® or Accpro® from British Petroleum Chemicals of Houston, Tex.

Suitable polymeric components may also include homopolymers of ethylene such as high density polyethylene or low density polyethylene; copolymers of ethylene and at least one other monomer chosen from $C_3$ to $C_{20}$ alpha-olefins, unsaturated organic acids and their derivatives, vinyl esters, aromatic vinyl compounds, vinylsilanes and unconjugated aliphatic and monocyclic diolefins, alicyclic diolefins which have an endocyclic bridge and conjugated aliphatic diolefins; or terpolymers of ethylene, a $C_3$ to $C_{20}$ alpha-olefin, and a nonconjugated diene monomer. In the case of ethylene/alpha-olefin copolymers, the alpha-olefin includes a $C_3$ to $C_{20}$ alpha-olefin, with propylene, butene, hexene, and octene being preferred.

For ethylenic terpolymers of the invention, the alpha-olefin again includes one or more $C_3$ to $C_{20}$ alpha-olefins with propylene, butene and octene being preferred and propylene being most preferred. The diene component is selected from the group consisting of $C_4$ to $C_{20}$ dienes. Preferred are non-conjugated dienes. Examples of suitable dienes include straight chain, hydrocarbon di-olefin or cycloalkenyl-substituted alkenes having from 6 to 15 carbon atoms. Specific examples include one or more of (a) straight chain acyclic dienes such as 1,4-hexadiene and 1,6-octadiene; (b) branched chain acyclic dienes such as 5-methyl-1,4-hexadiene; 3,7-dimethyl-1,6-octadiene; 3,7-dimethyl-1,7-octadiene; and the mixed isomers of dihydromyricene and dihydro-ocinene; (c) single ring alicyclic dienes, such as 1,3 cyclopentadiene; 1,4-cyclohexadiene; 1,5-cyclooctadiene and 1,5-cyclododecadiene; (d) multi-ring alicyclic fused and bridged ring dienes such as tetrahydroindene; methyl-tetrahydroindene; dicyclopentadiene (DCPD); bicyclo-(2.2.1)-hepta-2,5-diene; alkenyl, alkylidene, cycloalkenyl and cycloalkylidene norbornene, such as 5-methylene-2-norbornene (MNB), 5-propenyl-2-norbornene, 5-isopropylidene-2-norbornene, 5-ethylidene-2-norbornene (ENB), 5-(4-cyclopentenyl)-2-norbornene, 5-cyclohexylidene-2-norbornene, and 5-vinyl-2-norbornene (VNB); and (e) cycloalkenyl-substituted alkenes, such as allyl cyclohexene, vinyl cyclooctene, allyl cyclodecene, vinyl cyclododecene. Of the non-conjugated dienes typically used, the preferred dienes include dicyclopentadiene, 1,4-hexadiene, 5-methylene-2-norbornene, and 5-ethylidene-2-norbornene, and mixtures thereof. Particularly preferred diolefins include 5-ethylidene-2-norbornene; 1,4-hexadiene, dicyclopentadiene and 5-vinyl-2-norbornene.

Most polyolefin elastomers are satisfactory in the practice of the invention, since the percentage of crosslinking is independent of the type of elastomer. Such elastomers are commercially available as Nordel® or Engage® from DuPont Dow Elastomers LLC of Wilmington, Del., as Keltan® from DSM Elastomers Americas of Baton Rouge, La., as Vistalon® or Exact® from ExxonMobil Chemicals of Houston, Tex., as Dutral® from EniChem Elastomers Americas of Houston, Tex., as Buna® EP from Bayer Corporation of Pittsburgh, Pa., or as Royalene® from Uniroyal Chemicals of Middlebury, Conn.

Suitable polymeric components may also include styrenic elastomers, which is a term used to designate an elastomer having at least one random or block segment of a styrenic monomer in combination with an olefinic component. The block structure of the styrenic elastomer useful in the current invention is preferably of the linear or radial type, and of the diblock or triblock type. The styrenic portion of the elastomer is preferably a polymer of styrene and its analogs and homologs, including alpha-methylstyrene, and ring-substituted styrenes, particularly ring-methylated styrenes. The preferred styrenics are styrene and alpha-methylstyrene, with styrene being especially preferred. The olefinic component of the styrenic elastomer may be ethylene, butylene, butadiene, isoprene, propylene, or a combination thereof. Preferred styrenic elastomers include styrene-ethylene/butylene, styrene-ethylene/butylene-styrene, styrene-ethylene/propylene, styrene-ethylene/propylene-styrene, styrene-ethylene/propylene-styrene-ethylene-propylene, styrene-butadiene-styrene, styrene-butylene-butadiene-styrene, or combinations thereof. Such styrenic elastomers are commercially available as, e.g., Kraton® from Kraton Polymers of Houston, Tex. or as Tuftec® from Asahi America Inc. of Malden, Mass.

The modified olefinic TPE compositions may be compounded with conventional additives or process aids such as thermal stabilizers, ultraviolet stabilizers, flame retardants, mineral fillers, extender or process oils, conductive fillers, nucleating agents, dispersants, plasticizers, impact modifiers, colorants, mold release agents, lubricants, anti-static agents, pigments, and the like.

Suitable mineral fillers include, but are not limited to, talc, ground calcium carbonate, precipitated calcium carbonate, precipitated silica, precipitated silicates, precipitated calcium silicates, pyrogenic silica, hydrated aluminum silicate, calcined aluminosilicate, clays, mica, and wollastonite, and combinations thereof.

Extender oils are often used to reduce any one or more of viscosity, hardness, modulus and cost of a composition. The most common extender oils have particular ASTM designations depending upon whether they are classified as paraffinic, naphthenic or aromatic oils. An artisan of ordinary skill in the processing of elastomers will readily recognize and be able to determine the most beneficial types of oil(s) for a given situation. The extender oils, when used, are desirably present in an amount within a range of about 10 to 80 pph parts of polymers, based on total composition weight.

Foaming agents can be included in the mixture typically to produce foamed articles. The expanding medium, or foaming agent, can include a physical foaming agent or a chemical foaming agent, or both. A physical foaming agent is a medium expanding composition that is a gas at temperatures and pressures encountered during the foam expanding step. Typically, a physical foaming agent is introduced to the polymer blend in the gaseous or liquid state and expands, for example, upon a rapid decrease in pressure. A chemical foaming agent is a compound or mixture of compounds that decompose at elevated temperatures to form one or more gases, which can be used to expand at least a portion of the polymer blend into a foam.

Melt blending is one preferred method for preparing the final polymer blend of the present invention. Techniques for melt blending of a polymer with additives of all types are known to those of ordinary skill in the art and can typically be used with the present invention. Typically, in a melt blending operation useful with the present invention, the individual components of the blend are combined in a mechanical extruder or mixer, and then heated to a temperature sufficient to form a polymer melt and effect the reactive modification. The mechanical mixer can be a continuous or batch mixer. Examples of suitable continuous mixers include single screw extruders, intermeshing co-rotating twin screw extruders such as Werner & Pfeiderer ZSK™ extruders, counter-rotating twin screw extruders such as those manufactured by Leistritz™, and reciprocating single screw kneaders such as Buss™ co-kneaders. Examples of suitable batch mixers include lateral 2-roll mixers such as Banbury™ or Boling™ mixers. The polymeric components of the olefinic TPE compositions, free radical generators (A), and co-curative agents (B) are melt blended until the free radical generator (A) is thermally decomposed and the co-curative agent (B) is at least substantially and preferably fully reacted. The temperature of the melt, residence time of the melt within the mixer, and the mechanical design of the mixer are several variables that affect the amount of shear to be applied to the composition during mixing. These variables can be readily selected by one of ordinary skill in the art based on the disclosure of the invention herein.

In a preferred embodiment, the final polymer blend is prepared by mixing the components (A) and (B) together with the polymeric components of the olefinic TPE composition in a Banbury™ mixer until the temperature of the polymer blend reaches 180° C., so that the free radical generator (A) is thermally decomposed and the co-curative agent (B) is fully reacted. The material is then discharged. Other ingredients, such as fillers, thermal stabilizers, and the like, as described above, may be added to the mix either during the initial blending or subsequently, when further processing is required. The improved melt strength olefinic thermoplastic elastomer composition of the present invention may be pelletized, such as by strand pelleting or commercial underwater pelletization. In one embodiment, articles may be formed directly from the modified blends without intermediate processing steps such as pelleting or shipping.

Pellets of the composition can be used to manufacture articles through conventional processing operations, such as thermoforming, that involves stretching and/or drawing. Similar industrial processes involving stretching and/or drawing include extrusions, blow molding, calendering or foam processing. In each of these processes, the melt strength of the polymer is critical to its success, since the melted and/or softened polymer must retain its intended shape while being handled and/or cooled.

During extrusion, for example, a plastic sheet extrusion system is fed by one or more extruders feeding a sheet extrusion die. The die is typically closely followed by a roll cooling system. The resulting partially cooled sheet can be further cooled on a roller conveyor of finite length. No particular limitation is imposed on the method of extrusion, and various known methods can be employed. The process of extrusion is well known to those of ordinary skill in the art and is described in detail in, e.g., Rauwendaal, "Polymer Extrusion" (ISBN 0-19-520747-5) Hanser Publications, New York (1990).

During calendering, a sheet is formed by passing the material through a series of heated rollers, with the gap between the last pair of heated rollers determining the thickness of the sheet. The process of calendering is well known to those of ordinary skill in the art and is described in detail in, e.g., Bering, "SPI Plastics Engineering Handbook" (ISBN 0-442-31799-9) Van Nostrand Reinhold, New York (1991).

Thermoforming is the process of heating a plastic material in sheet form to its particular processing temperature and forming the hot and flexible material against the contours of a mold by mechanical or pneumatic means. When held to the shape of the mold and allowed to cool, the plastic retains the shape and detail of the mold. The process of thermoforming is well known to those of ordinary skill in the art and is described in detail in, e.g., Throne, "Thermoforming" (ISBN 0-02-947610-0) Hanser Publications, New York (1987).

During form processing, a structure that must hold its shape is developed from melted polymer by the use of blowing agents. U.S. Pat. No. 4,323,528, the disclosure of which is incorporated herein by express reference thereto, relates to making polyolefin foams using an accumulating extrusion process. The process comprises: 1) mixing a thermoplastic material and a blowing agent to form a polymer gel; 2) extruding the gel into a holding zone maintained at a temperature and pressure that does not allow the mixture to foam; the holding zone has a die defining an orifice opening into a zone of lower pressure at which the gel foams and an openable gate closing the die orifice; 3) periodically opening the gate; 4) substantially concurrently applying the mechanical pressure by means of a movable ram on the gel to eject it from the holding zone through the die orifice into the zone of lower pressure; and 5) allowing the ejected gel to expand to form the foam. The process of foam processing is well known to those of ordinary skill in the art and is described in detail in, e.g., Frisch, "Plastic Foams" (ISBN 0-82-471218-8) Marcel Dekker, New York (1972).

During blow molding, air pressure is used to expand the melted polymer into hollow shapes. The principal advantage of this process is its ability to produce hollow shapes without having to join two or more separately molded parts. The process of blow molding is well known to those of ordinary skill in the art and is described in, e.g., detail in Rosato, "Blow Molding Handbook" (ISBN 0-19-520761-0) Hanser Publications, New York (1989).

Articles of the invention that can be manufactured using these techniques include interior automotive components, such as instrument panel skins and door panel skins; building materials, such as thermal and sound insulation; packaging materials; electrical and electronics materials; nonwoven fabrics and fibers; and the like.

The melt strength of a polymer is determined here by a Gottfert™ Rheotens Melt Tension instrument Model 71.97, which measures the force in centi-Newtons (cN) required to pull a polymer melt strand from a capillary die at constant acceleration. In this test, a polymer melt strand extruded vertically downwards from a capillary die was drawn by rotating rollers whose velocity increased at a constant acceleration rate. The polymer melt being stretched typically undergoes uniaxial extension. The melt strength parameter does not give a well-defined rheological property because neither the strain, nor the temperature, was uniform in the polymer melt being stretched. The test is useful, however, in obtaining meaningful comparisons of the drawing behavior of different polymers. The measured force increases as the roller velocity is increased and then generally remains constant until the strand breaks. Melt strength tests were conducted by piston extrusion of polymer melt through a die 2 mm in diameter at a wall shear rate of 58 $\sec^{-1}$, and at different melt temperatures, such as 180° C., 200° C. and 220° C. A consistently improved melt strength over a broader range of temperatures is an indication of an increased processing window for the manufactured product.

In order to measure the gel content of the thermoplastic elastomeric composition, a Soxhlet extraction technique is used to determine the amount of extractables. The equipment includes a 500 ml pear-shaped flask, the Soxhlet apparatus and a Dimroth cooler. A sample of approximately one gram is compressed to a very thin film and then cut into pieces of approximately 0.5 $cm^2$ to 1 $cm^2$, brought into an extraction thimble, and mounted in the Soxhlet apparatus. The extraction is performed with 300 mL xylene. The xylene in the flask is heated with a heat mantle connected to a voltage controller set at a temperature of 140° C. After refluxing for about 12 hours, the xylene is removed in a vacuum oven by dry air at 120° C. for at least 12 hours. Subsequently, the weight of the residue in the flask is determined. The amount of crosslinking is expressed as a percentage of gel content calculated from the amount of xylene insoluble polymeric material minus any nonsoluble fiber divided by the total amount of crosslinked thermoplastic elastomeric material.

Figure 2:
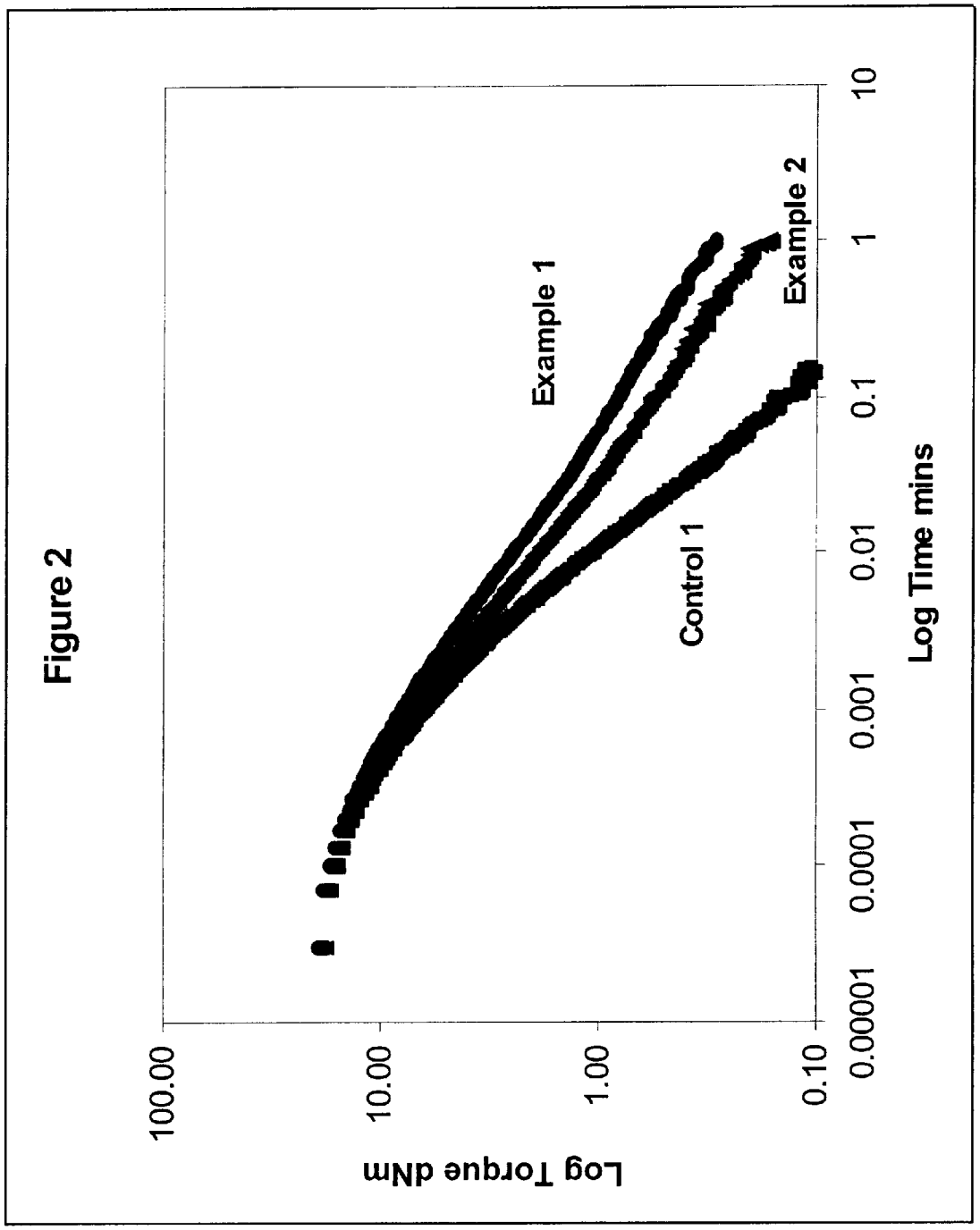
FIG. 2 is a graphical depiction of the stress relaxation exhibited by a polymer of the invention, as measured with the RPA-2000 device.

The improvement of polymer rheological behavior is shown by shear viscosity tests with an RPA 2000 instrument manufactured by Alpha Technologies. The RPA 2000 utilizes a biconic cavity forced angular displacement applied to the lower cavity and a transducer that measures torque and displacement of the upper cavity. The instrument is very similar to those described in ASTM D-5289 or ASTM D-6204, except that rotational strain and frequency are programmable variables during the test. The test cavity is very similar to a parallel plate rheometer, with a sealed test cavity and biconical dies to prevent edge slip. The cavity size is approximately 35 mm in diameter with a volume of 4.5 cm³. Samples were heated to 190° C. to fully met the material with an applied strain of 42% and 1 Hz frequency, and then were cooled to 160° C. for variable frequency and strain tests near the solidification point. This test condition was chosen to simulate the process of thermoforming just above the melt point of the propylenic resin. Stress relaxation was also measured with this instrument at a temperature of 160° C. after an initial deformation of 7° (100% strain) applied over a duration of approximately 5 milliseconds. The resulting decay in torque was recorded for sixty seconds. Test results from these tests are shown in FIGS. 1 and 2.

Unless indicated to the contrary, all weight percents are relative to the weight of the total composition. Unless indicated to the contrary, the expression pph means parts per hundred per parts of polymer, by weight, in the final composition.

Unless specified otherwise, the term "Mooney viscosity," as used herein, means viscosity measured according to ASTM D-1646, incorporated herein by reference, using a shear rheometer at 125° C. and measured according to ML 1+4.

The term "about," as used herein, should generally be understood to refer to both numbers in a range of numerals. Moreover, all numerical ranges herein should be understood to include each tenth of an integer within the range.

All of the patents and other publications recited herein in the detailed description of the invention are incorporated herein by express reference thereto.

The invention is further illustrated by the following examples.

EXAMPLES

Blends of the currents invention were mixed and then injection molded into plaques approximately 3.2 mm thick from which ASTM D-412 Type C dumbbell specimens were die cut and then measured for mechanical properties at test speeds of 500 mm/min with a gage length of 25 mm. The significance of the symbols used in these examples, the units expressing the variables mentioned, and the methods of measuring these variables, are explained below.

| | |
|---|---|
| Hardness | Shore A and/or Shore D hardness measured according to ASTM D-2240 at 5 seconds and at room temperature |
| UTS, MPa | Ultimate tensile strength, with crosshead velocity of 500 mm/min, measured in mega Pascals, according to ASTM D-412 |
| Ult. Elong. % | Ultimate elongation percent, with crosshead velocity of 500 mm/min, according to ASTM D-412 |
| 100% Strain, MPa | Stress at 100% Elongation, measured in mega Pascals, according to ASTM D-412 |
| Flex Modulus, MPa | Flexural modulus, measured in mega Pascals, according to ASTM D-790 |
| Gloss, 60° | Specular gloss, measured at 60 degrees, according to ASTM D-2457 |
| Gloss reduction | Ratio of the surface gloss level before addition of the curative agents to the gloss level after addition of the curative agents |
| $MFR_{2.16}$ | Melt flow rate measured at 230° C., under a load of 2.16 kg, according to ASTM D-1238 |
| $MFR_{10}$ | Melt flow rate measured at 230° C., under a load of 10 kg, according to ASTM D-1238 |
| Gel content | Crosslinked weight percent determined by Soxhlet extraction with boiling xylene, expressed as the percent of un-extractable material relative to the polyolefin elastomer added to the composition |
| MS [cN] | Melt strength as determined by a Gottfert ™ Rheotens Melt Tension instrument Model 71.97 that measures the force in centi-Newtons (cN) required to pull a polymer melt strand from a capillary die at constant acceleration at a temperature of at least 180° C. |
| MSR | Melt strength ratio - Ratio of the melt strength of the modified blend to the melt strength of the blend before modification measured at a temperature of 220° C. |

Materials Used in the Examples:

| | |
|---|---|
| PP-1 | Polypropylene homopolymer with MFR of 0.7 dg/min at 230° C. and 2.16 kg weight |
| PP-2 | Polypropylene homopolymer with MFR of 12 dg/min at 230° C. and 2.16 kg weight |
| EAO-1 | Copolymer of ethylene and alpha-olefins; Ethylene content 70%; Mooney 35 (ML 1 + 4, 125° C.); molecular weight (MW): 140,000; Polydispersity: 2.0; Density: 0.868 g/cm³; Melt Index: 0.5 dg/min at 190° C. |
| EAO-2 | Copolymer of ethylene and alpha-olefins; Ethylene content 70%; Mooney 35 (ML 1 + 4, 125° C.); molecular weight (MW): 150,000; Polydispersity: 2.0; Density: 0.863 g/cm³; Melt Index: 0.5 dg/min at 190° C. |
| EPDM-1 | Terpolymer of ethylene, alpha-olefin and diene monomer; Ethylene content 70%; ethylidene norbornene content 5%; Mooney 70 (ML 1 + 4, 125° C.); molecular weight (MW): 200,000; Polydispersity: 3 |
| Co-curative | zinc (di)acrylate |
| Peroxide | 2,5-bis(t-butylperoxy)2,5-dimethylhexane |

Examples 1–4 and Controls 1–4 in Table I were prepared on a Farrel BR Banbury mixer at a mixing temperature below 180° C. When the temperature in the mixer reached 180° C., the materials were discharged. Example 5 and Control 5 were compounded in a Leistriz 27 mm co-rotating twin screw laboratory extruder with a length to diameter ratio (L/D) of 52:1. The solid materials were added in the first feed port. The extrusion temperature was below 195° C., and the extruder speed was 500 rpm. All examples were prepared with about 1 pph of appropriate process and heat stabilizers, such as Tetrakis[methylene(3,5-di-tert-butyl-4 hydroxy hydrocinnamate)]methane.

The information presented in Table 1 shows the contrast between the use of different polypropylenes having different melt flow rates, as well as the use of combination of different elastomers. The low concentration of peroxide minimized undesirable polypropylene degradation, as indicated by the low melt flow rates of the modified blends of the invention. The low concentration of peroxide was also insufficient to promote crosslinking of the olefinic TPE, as shown by the gel content of Controls 1–5. In addition, the lower the melt strength of the initial olefinic TPE composition, the more the melt strength will be improved through the modification of the present invention.

The experiments summarized in Table 1 illustrate that the use of peroxide at very low levels without the co-curative agent cannot sufficiently increase the melt strength (MS) nor decrease the melt flow rate (MFR) of the olefinic TPE compositions. In contrast, the melt strength of Examples 1–4 was improved more than 3 times over the melt strength of the unmodified compositions. The ratio of melt strength is calculated by dividing the melt strength of the example by the melt strength of the corresponding control sample.

Also, the modification of the present invention is an efficient method for reducing the surface gloss of olefinic TPE compositions. The gloss level was reduced to one fifth of the original reading, or lower, by the modification. Gloss reduction is calculated by dividing the melt strength of the example by the melt strength of the corresponding control sample.

The measurements for modulus, tensile strength and elongation show that the modification of the current invention does not adversely effect the physical properties of the blend, and, in fact, demonstrate that the modified composition has better compatibility than the non-modified composition.

FIG. 1 is a graphical depiction of the mechanical loss factor (tangent-delta) as a function of the in-phase shear modulus (G'), or storage modulus, for Examples 1 and 2 as well as Control 1, measured at constant shear rate (approximately 14 sec$^{-1}$) obtained by variable strain and frequency at a temperature of 160° C. in the melt state. The storage modulus decreases with increasing strain, but much less so with the modified material. FIG. 1 illustrates that the modification of the current invention improves the elasticity of the sample, especially with increasing strain. Such as improvement in elasticity translates into improved processing characteristics of the material where high stress or strain levels are encountered, such as reduced sag during profile or sheet extrusion, higher speed calendering, or reduced sag and improved draw during thermoforming of thermoplastic sheet.

FIG. 2 is a graphical depiction of the stress relaxation exhibited by the invention, as measured with the RPA-2000 device. The measurement was performed by recording the torque on a slab of material sheared to 100% strain at 160° C. in the melt state. The shear modulus is proportional to the measured torque. The invention reduced the rate of stress relaxation and increased the plateau shear modulus.

Figure 3:
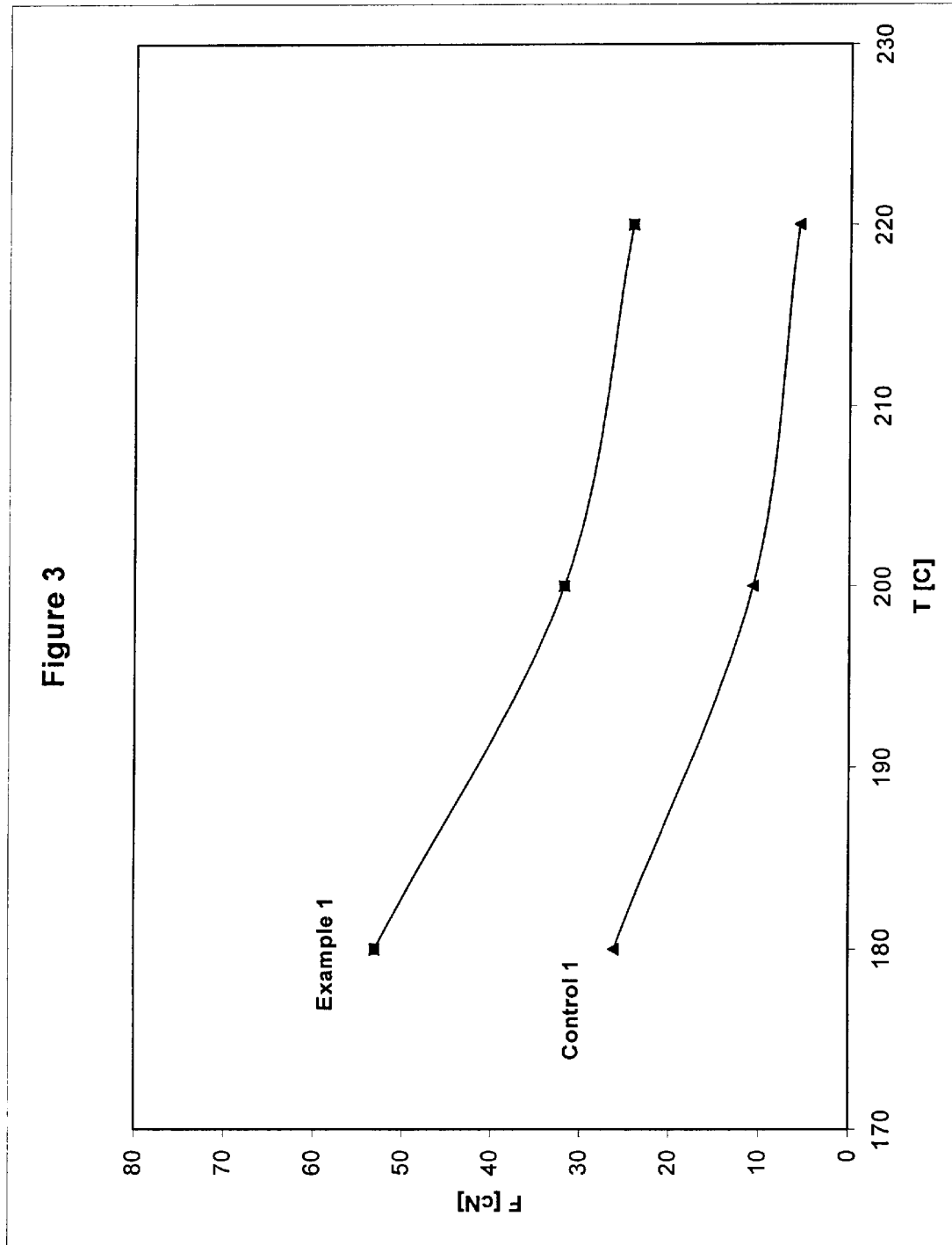
FIG. 3 is a graphical depiction of the tensile force [cN] of Example 1 and Control 1 as a function of temperature as measured on the Gottfert™ Rheotens Melt Tension Instrument Model 71.97.

FIG. 3 is a graphical depiction of the tensile force of Example 1 and Control 1 as a function of temperature as measured on the Gottfert™ Rheotens Melt Tension Instrument Model 71.97. The invention increased the force required to elongate the molten strand of material. Test conditions are those described in the text.

TABLE I

| Sample | Ex. 1 | Ex. 2 | Ex. 3 | Ex. 4 | Ex. 5 | Cont. 1 | Cont. 2 | Cont. 3 | Cont. 4 | Cont. 5 |
|---|---|---|---|---|---|---|---|---|---|---|
| PP-1, wt. % | 30 | 30 | — | — | 30 | 30 | 30 | — | — | 30 |
| PP-2, wt. % | — | — | 30 | 30 | — | — | — | 30 | 30 | — |
| EAO-1, wt. % | 70 | 70 | 70 | 70 | 37 | 70 | 70 | 70 | 70 | 37 |
| EPDM-1, wt. % | — | — | — | — | 32 | — | — | — | — | 33 |
| Co-curative, pph | 1.0 | 0.5 | 1.0 | 0.5 | 1.0 | — | — | — | — | — |
| Peroxide, pph | 0.02 | 0.02 | 0.02 | 0.02 | 0.02 | — | 0.02 | — | 0.02 | — |
| Hardness, Shore A | 90 | 90 | 91 | 90 | 89 | 91 | 87 | 90 | 89 | 89 |
| UTS, MPa | 14 | 12 | 13 | 13 | 12 | 12 | 11 | 11 | 10 | 13 |
| Ult Elong, % | 650 | 540 | 930 | 940 | 600 | 320 | 360 | 390 | 440 | 400 |
| 100% Strain, MPa | 11 | 10 | 9 | 9 | 9 | 11 | 10 | 11 | 9 | 12 |
| Flex Modulus, Mpa | 272 | 285 | 294 | 318 | 167 | 308 | 303 | 419 | 315 | 254 |
| Gloss, 60° | 13 | 10 | 16 | 21 | 19 | 64 | 71 | 70 | 74 | 63 |
| Gloss reduction | 0.20 | 0.16 | 0.23 | 0.30 | 0.30 | | | | | |
| MFR$_{2.16}$, dg/min | <0.1 | <0.1 | <0.1 | 0.2 | <0.1 | 1.0 | 1.2 | 2.3 | 2.6 | <0.1 |
| MFR$_{10}$, dg/min | 1.1 | 2.1 | 4.2 | 5.9 | 0.85 | 10.6 | 11.7 | 30.2 | 34.0 | 0.36 |
| Gel content, % | 36 | 53 | 23 | 28 | — | <1 | <1 | <1 | <1 | — |
| MS, 180° C., cN | 53 | 43 | 26 | 22 | 37 | 26 | 12 | 9 | 7 | 23 |
| MS, 200° C., cN | 32 | | 19 | | | 11 | | 5 | | |
| MS, 220° C., cN | 24 | 22 | 18 | 16 | | 6 | | 3 | | |
| MSR, 220° C. | 4 | 3.7 | 6 | 5.3 | | | | | | |

The samples in Table II were prepared on a Farrell BR Banbury mixer at a mixing temperature below 180° C. When the temperature in the mixer reached 180° C., the material was discharged. Table II shows the results of the modification of the current invention on different blends of olefinic thermoplastic elastomers.

Although the melt strength of the unmodified polypropylene in Control 6 is higher at 180° C. than the modified polypropylene in Example 6, this anomaly may have been due to the peculiarities of the highly crystalline polymer. Such a phenomenon has been observed by other authors (e.g., Lau et al., Polymer Eng. Sci. 38 (1998), page 1915) and is thought to be caused by flow-induced crystallization. The melt flow rate and gloss are both, however, still much higher for Control 6 than for polymers modified according to the invention.

Example 6 and Control 6 also illustrate that the modification of the current invention increases the processing window during manufacturing since the melt strength of the modified sample is held to a consistently high level over a broader range of temperatures than the unmodified sample.

Table II also demonstrates that the increase of melt strength of the TPO compositions is not simply the summation of the melt strength of all the components.

Figure 4:
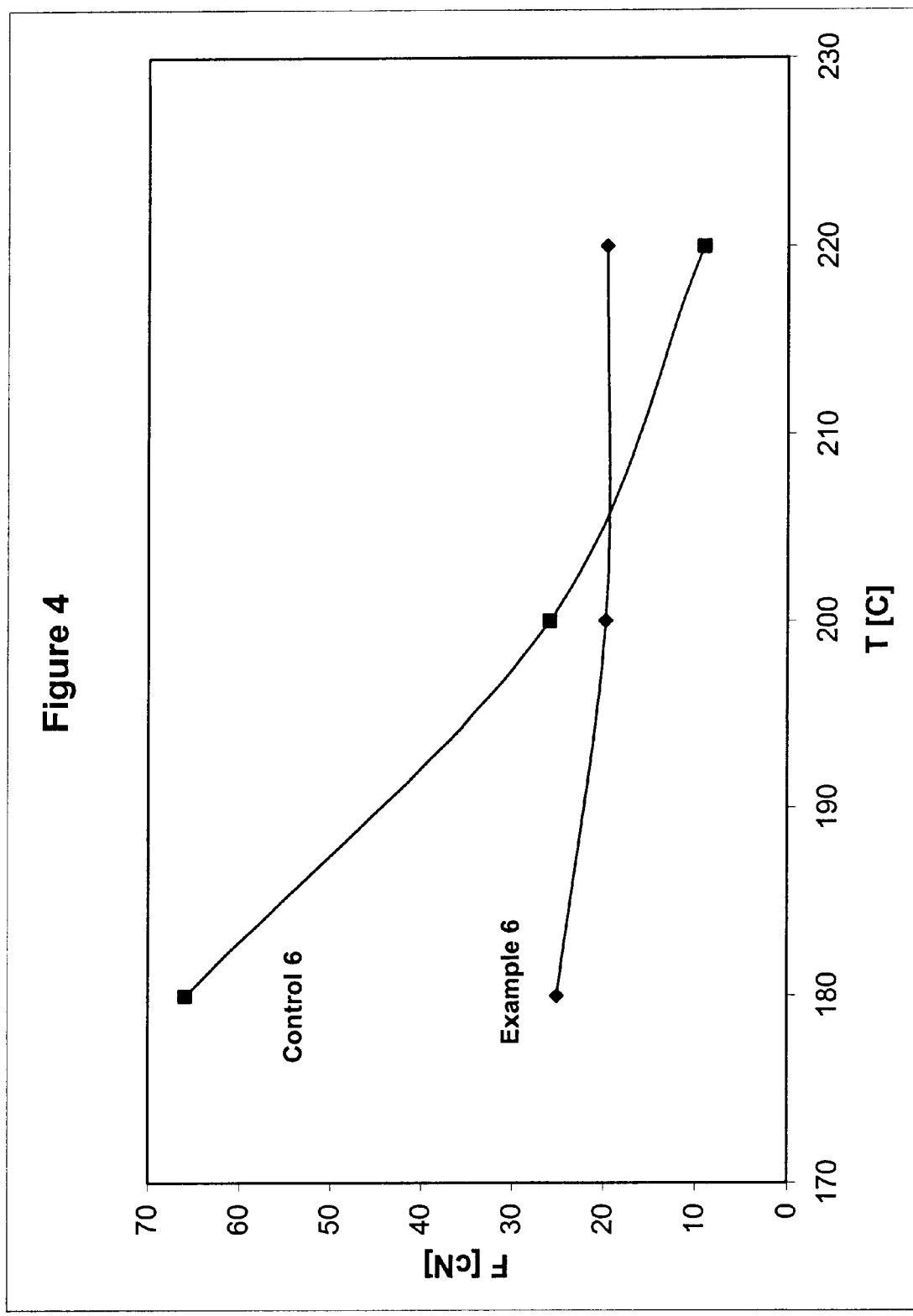
FIG. 4 is a graphical depiction of the tensile force [cN] of Example 6 and Control 6 as a function of temperature as measured on the Gottfert™ Rheotens Melt Tension Instrument Model 71.97.

FIG. 4 is a graphical depiction of the tensile force of Example 6 and Control 6 as a function of temperature as measured on the Gottfert™ Rheotens Melt Tension Instrument Model 71.97. The invention consistently modified the melt strength of pure polypropylene over a broader range of temperatures, thus increasing the processing window during manufacturing.

TABLE II

| Sample | Ex. 6 | Ex. 7 | Ex. 8 | Ex. 9 | Ex. 10 | Ex. 11 | Cont. 6 | Cont. 7 |
|---|---|---|---|---|---|---|---|---|
| PP-1, wt. % | 100 | — | 80 | 60 | 40 | 20 | 100 | — |
| EAO-1, wt. % | — | 100 | 20 | 40 | 60 | 80 | — | 100 |
| Co-curative, pph | 1.0 | 1.0 | 1.0 | 1.0 | 1.0 | 1.0 | — | — |
| Peroxide, pph | 0.02 | 0.02 | 0.02 | 0.02 | 0.02 | 0.02 | — | — |
| Hardness, Shore A | 95 | 67 | 95 | 95 | 95 | 85 | 95 | 67 |
| UTS, MPa | 37 | 7 | 27 | 18 | 16 | 11 | 37 | 5 |
| Ult Elong, % | 28 | 880 | 150 | 460 | 570 | 730 | 42 | 750 |
| 100% Strain, MPa | — | 2 | 22 | 18 | 14 | 7 | — | 2 |
| Flex Modulus, MPa | 2343 | 14 | 1494 | 943 | 370 | 124 | 2426 | 14 |
| Gloss, 60° | 31 | 12 | 23 | 18 | 15 | 11 | 79 | 86 |
| $MFR_{2.16}$, dg/min | 0.4 | <0.1 | 0.1 | 0.2 | 0.1 | <0.1 | 0.7 | 1.2 |
| $MFR_{10}$, dg/min | 7.2 | 0.3 | 3.5 | 5.1 | 1.4 | 2.2 | 11.8 | 9.6 |
| Gel content, % | 26 | 53 | 26 | 27 | 30 | 47 | <1 | <1 |
| MS, 180° C., cN | 25 | 38 | 38 | 38 | 50 | 40 | 66 | 9 |
| MS, 200° C., cN | 20 | | | | | | 26 | |
| MS, 220° C., cN | 20 | | | | | | 9 | |

The samples in Table III were prepared as described for Table II. The results of the experiment summarized in Table III illustrate that the use of either free radical generators or co-curative agents alone at the level claimed in this invention does not improve melt strength of olefinic thermoplastic elastomers; the combination of both is necessary, as shown in Table IV.

TABLE III

| Sample | Cont. 8 | Cont. 9 | Cont. 10 | Cont. 11 | Cont. 12 |
|---|---|---|---|---|---|
| PP-1, wt. % | 30 | 30 | 30 | 30 | 30 |
| EAO-2, wt. % | 70 | 70 | 70 | 70 | 70 |
| Co-curative, pph | — | — | 3.1 | 6.5 | — |
| Peroxide, pph | 0.02 | 0.04 | — | — | — |
| Hardness, Shore A | 91 | 91 | 87 | 89 | 89 |

TABLE III-continued

| Sample | Cont. 8 | Cont. 9 | Cont. 10 | Cont. 11 | Cont. 12 |
|---|---|---|---|---|---|
| UTS, MPa | 11 | 12 | 12 | 12 | 13 |
| Ult Elong, % | 520 | 620 | 330 | 400 | 380 |
| 100% Strain, MPa | 10 | 10 | 11 | 12 | 12 |
| Flex Modulus, MPa | 217 | 186 | 215 | 175 | 259 |
| Gloss, 60° | 56 | 12 | 13 | 12 | 50 |
| $MFR_{2.16}$, dg/min | <0.1 | 0.4 | 0.8 | 0.6 | 1.0 |

TABLE III-continued

| Sample | Cont. 8 | Cont. 9 | Cont. 10 | Cont. 11 | Cont. 12 |
|---|---|---|---|---|---|
| $MFR_{10}$, dg/min | 1.3 | 6.5 | 7.2 | 5.8 | 9.9 |
| MS, 180° C., cN | 12 | 24 | 19 | 15 | 26 |

The samples in Table IV were prepared as described for Table II. The results further explore the varying concentrations of free radical generators and co-curative agents that can be utilized by the method of the present invention to obtain surprisingly beneficial properties of higher melt strength and lower gloss in the modified olefinic TPE polymers.

TABLE IV

| Sample | Ex. 12 | Ex. 13 | Ex. 14 | Ex. 15 | Ex. 16 | Ex. 17 | Cont. 12 |
|---|---|---|---|---|---|---|---|
| PP-1, wt. % | 30 | 30 | 30 | 30 | 30 | 30 | 30 |
| EAO-2, wt. % | 70 | 70 | 70 | 70 | 70 | 70 | 70 |
| Co-curative, pph | 1.5 | 4.8 | 3.1 | 6.5 | 1.5 | 4.8 | — |
| Peroxide, pph | 0.01 | 0.01 | 0.02 | 0.02 | 0.03 | 0.03 | — |
| Hardness, Shore A | 90 | 89 | 88 | 87 | 90 | 90 | 89 |
| UTS, MPa | 13 | 14 | 14 | 15 | 13 | 13 | 13 |
| Ult Elong, % | 370 | 400 | 430 | 410 | 580 | 370 | 380 |
| 100% Strain, MPa | 13 | 13 | 13 | 14 | 11 | 12 | 12 |
| Flex Modulus, MPa | 199 | 174 | 186 | 119 | 161 | 130 | 259 |
| Gloss, 60° | 8 | 5 | 9 | 4 | 6 | 6 | 50 |
| Gloss reduction | 0.16 | 0.1 | 0.18 | 0.08 | 0.12 | 0.12 | |
| $MFR_{2.16}$, dg/min | <0.1 | <0.1 | <0.1 | <0.1 | <0.1 | <0.1 | 1.0 |
| $MFR_{10}$, dg/min | 0.6 | 0.1 | 0.3 | <0.1 | 0.7 | <0.1 | 9.9 |

TABLE IV-continued

| Sample | Ex. 12 | Ex. 13 | Ex. 14 | Ex. 15 | Ex. 16 | Ex. 17 | Cont. 12 |
|---|---|---|---|---|---|---|---|
| MS, 180° C., cN | 51 | 43 | 42 | 37 | 37 | 34 | 26 |
| MS, 220° C., cN | 26 | 16 | 19 | 15 | 21 | 13 | 6 |
| MSR, 220° C. | 4.3 | 2.7 | 3.2 | 2.5 | 3.5 | 2.2 | |

The modified compositions prepared according to the invention can be used by any and all classical processes for the manufacture of shaped articles of olefinic polymers, such as processes of extrusions, calendering, blow molding, injection molding, compression molding, thermoforming, and foam processing. A wide variety of articles using such polymers can be envisioned by those of ordinary skill in the art, as well.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A modified olefinic thermoplastic elastomer composition formed by melt blending an olefinic thermoplastic elastomer with sufficient amounts of a free radical generator (A) and a co-curative agent (B) to promote crosslinking to a gel content of about 10 to 80%, wherein the olefinic thermoplastic elastomer and the modified olefinic thermoplastic elastomer composition each have a melt strength measured at a temperature of 220° C. and a surface gloss level, with the melt strength of the modified olefinic thermoplastic elastomer composition divided by the melt strength of olefinic thermoplastic elastomer before addition of the curative agents providing a ratio of about 1.5/1 to 20/1, and with the surface gloss level of the olefinic thermoplastic elastomer composition after addition of the curative agents (GL2) divided by the surface gloss level of the olefinic thermoplastic elastomer composition before addition of the curative agents (GL1) providing a ratio which is equal to or greater than 0.01 but equal to or less than 0.5, wherein the sufficient amounts are about 0.001 to 0.05 pph of free radical generator (A) and about 0.001 to 7.5 pph of co-curative agent (B).

2. The composition of claim 1, wherein the ratio of the melt strength of the modified olefinic thermoplastic elastomer composition to the melt strength of the olefinic thermoplastic elastomer composition before addition of the curative agents is about 1.6/1 to 15/1.

3. The composition of claim 1, wherein the free radical generator (A) comprises one or more peroxides, persulfates, or diazo compounds, or mixtures thereof.

4. The composition of claim 3, wherein the free radical generator (A) comprises at least one organic peroxide.

5. The composition of claim 4, wherein the free radical generator (A) has a decomposition half-life of greater than about one hour at 120° C.

6. The composition of claim 1, wherein the co-curative agent (B) comprises metal salts of alpha, beta-unsaturated carboxylic acids, or alpha, beta-unsaturated carboxylic acids where the pending acid group has been neutralized, or mixtures thereof.

7. The composition of claim 6, wherein the alpha, beta-unsaturated carboxylic acids of co-curative agent (B) comprise acrylic, methacrylic, maleic, fumaric, ethacrylic, vinyl-acrylic, itaconic, methyl itaconic, aconitic, methyl aconitic, crotonic, alpha-methylcrotonic, cinnamic, or 2,4-dihydroxy cinnamic acids, or mixtures thereof.

8. The composition of claim 7, wherein the alpha, beta-unsaturated carboxylic acids of co-curative agent (B) comprise acrylic, methacrylic, or maleic acids, or mixtures thereof.

9. The composition of claim 6, wherein the metals for forming the metal salts of co-curative agent (B) comprise zinc, lithium, calcium, magnesium, sodium, or aluminum, or mixtures thereof.

10. The composition of claim 1, further comprising one or more thermal stabilizers, ultraviolet stabilizers, flame retardants, mineral fillers, extender or process oils, conductive fillers, nucleating agents, plasticizers, impact modifiers, colorants, mold release agents, lubricants, antistatic agents, or pigments, or combinations thereof.

11. The article comprising the modified olefinic thermoplastic elastomer composition of claim 1.

12. The article of claim 11, formed by extrusion, thermoforming, injection molding, compression molding, blow molding, foam processing or calendering.

13. The composition of claim 1 formed by a process which comprises melt blending a thermoplastic elastomer in the presence of the sufficient amounts of a free radical generator (A) and a co-curative agent (B) for a sufficient time and at a sufficient temperature to generate co-curative radicals and form the modified olefinic thermoplastic elastomer composition.

14. The method of claim 13, wherein the sufficient amounts are about 0.001 to 0.04 pph of free radical generator (A) and about 0.001 to 7 pph of co-curative agent (B).

15. The method of claim 13, wherein the free radical generator (A) comprises at least one organic peroxide.

16. The method of claim 13, wherein the free radical generator (A) has a decomposition half-life of greater than about one hour at 120° C.

17. The method of claim 13, wherein the co-curative agent (B) comprises alpha, beta-unsaturated carboxylic acids of at least one of acrylic, methacrylic, maleic, fumaric, ethacrylic, vinyl-acrylic, itaconic, methyl itaconic, aconitic, methyl aconitic, crotonic, alpha-methylcrotonic, cinnamic, or 2,4-dihydroxy cinnamic acids, or mixtures thereof, or a metal salt comprising zinc, lithium, calcium, magnesium, sodium, or aluminum, or mixtures thereof.

18. The method of claim 13, which further comprises forming the modified composition into an article.

19. The method of claim 18, wherein the forming includes extruding, thermoforming, injection molding, compression molding, blow molding, foam processing or calendering the modified composition to form the article.

20. A modified olefinic thermoplastic elastomer composition formed by melt blending an olefinic thermoplastic elastomer with sufficient amounts of a free radical generator (A) and a co-curative agent (B) to promote crosslinking to a gel content of about 10 to 80%, wherein the olefinic thermoplastic elastomer and the modified olefinic thermoplastic elastomer composition each have a melt strength measured at a temperature of 220° C. and a surface gloss level, with the melt strength of the modified olefinic thermoplastic elastomer composition divided by the melt strength of olefinic thermoplastic elastomer before addition of the curative agents providing a ratio of about 1.5/1 to 20/1, and with the surface gloss level of the olefinic thermoplastic elastomer composition after addition of the curative agents (GL2) divided by the surface gloss level of the olefinic thermoplastic elastomer composition before addition of the curative agents (GL1) providing a ratio which is equal to or greater than 0.01 but equal to or less than 0.5, wherein the sufficient amounts are about 0.001 to 0.04 pph of free radical generator (A) and about 0.001 to 7 pph of co-curative agent (B).

* * * * *